(12) United States Patent
Schwarz et al.

(10) Patent No.: US 10,078,315 B2
(45) Date of Patent: Sep. 18, 2018

(54) COLLABORATIVE BALANCING OF RENEWABLE ENERGY OVERPRODUCTION WITH ELECTRICITY-HEAT COUPLING AND ELECTRIC AND THERMAL STORAGE FOR PROSUMER COMMUNITIES

(71) Applicant: NEC Europe Ltd., Heidelberg (DE)

(72) Inventors: Maja Schwarz, Heidelberg (DE); Anett Schuelke, Gaiberg (DE)

(73) Assignee: NEC CORPORATION, Tokyo (JP)

( * ) Notice: Subject to any disclaimer, the term of this patent is extended or adjusted under 35 U.S.C. 154(b) by 445 days.

(21) Appl. No.: 14/788,855

(22) Filed: Jul. 1, 2015

(65) Prior Publication Data
US 2016/0011577 A1 Jan. 14, 2016

Related U.S. Application Data

(60) Provisional application No. 62/023,210, filed on Jul. 11, 2014.

(51) Int. Cl.
| | |
|---|---|
| *G05B 15/02* | (2006.01) |
| *G06Q 50/06* | (2012.01) |
| *H02J 3/14* | (2006.01) |
| *H02J 13/00* | (2006.01) |

(52) U.S. Cl.
CPC ............ *G05B 15/02* (2013.01); *G06Q 50/06* (2013.01); *H02J 3/14* (2013.01); *H02J 13/0006* (2013.01); *Y02B 70/3225* (2013.01); *Y04S 20/222* (2013.01)

(58) Field of Classification Search
CPC ..... G05B 15/02; G06Q 50/06; H02J 13/0006; H02J 3/14; Y02B 70/3225; Y04S 20/222
USPC ........................................................ 700/295
See application file for complete search history.

(56) References Cited

U.S. PATENT DOCUMENTS

| | | | | |
|---|---|---|---|---|
| 6,601,084 B1 * | 7/2003 | Bhaskaran | ............. | G06F 9/505 709/223 |
| 7,343,360 B1 * | 3/2008 | Ristanovic | ............. | G06Q 30/08 705/412 |
| 7,991,512 B2 * | 8/2011 | Chandra | ................ | G06Q 10/06 700/291 |
| 8,706,650 B2 * | 4/2014 | Ozog | .................... | G06Q 10/06 700/291 |

(Continued)

*Primary Examiner* — Chun Cao
(74) *Attorney, Agent, or Firm* — Leydig, Voit & Mayer, Ltd.

(57) ABSTRACT

A system and method perform electricity and heat load balancing within a community of energy nodes. The system includes a central control device to solve an optimization problem over a planning horizon and to run an allocation algorithm. Local agent devices communicate with the central control device. Each local agent device receives input parameters from an energy node. Each energy node includes electricity generation equipment, electrical heat-generating equipment, and power transmission equipment, electricity storage equipment and thermal storage equipment. The local agent devices operate the electrical heat-generating equipment based on an allocation instruction received from the central control device. The central control device receives status information from the local agent devices to determine an amount of energy to be converted from electricity to heat by the electrical heat-generating equipment of the energy nodes, to provide the allocation instruction to the energy nodes.

15 Claims, 6 Drawing Sheets

(56) References Cited

U.S. PATENT DOCUMENTS

| | | | | |
|---|---|---|---|---|
| 2003/0158826 | A1* | 8/2003 | Burke | G01D 4/002 |
| | | | | 705/412 |
| 2007/0276547 | A1* | 11/2007 | Miller | G06Q 50/06 |
| | | | | 700/295 |
| 2008/0167756 | A1* | 7/2008 | Golden | G05B 15/02 |
| | | | | 700/297 |
| 2008/0177423 | A1* | 7/2008 | Brickfield | H02J 3/008 |
| | | | | 700/291 |
| 2010/0138363 | A1* | 6/2010 | Batterberry | G06Q 10/04 |
| | | | | 705/412 |
| 2010/0217550 | A1* | 8/2010 | Crabtree | H02J 3/005 |
| | | | | 702/62 |
| 2016/0062380 | A1* | 3/2016 | Schwarz | G05F 1/66 |
| | | | | 700/295 |
| 2016/0239032 | A1* | 8/2016 | Yu | G06Q 10/04 |

* cited by examiner

COLLABORATIVE BALANCING OF RENEWABLE ENERGY OVERPRODUCTION WITH ELECTRICITY-HEAT COUPLING AND ELECTRIC AND THERMAL STORAGE FOR PROSUMER COMMUNITIES

CROSS-REFERENCE TO PRIOR APPLICATION

Priority is claimed to U.S. Provisional Patent Application Ser. No. 62/023,210, filed on Jul. 11, 2014, the entire disclosure of which is hereby incorporated by reference herein.

STATEMENT REGARDING FUNDING

The work leading to this invention has received funding from the European Union's Seventh Framework Programme (FP7/2007-2013) under grant agreement n° 608930.

FIELD

The present invention relates to a system and method for balancing energy production and storage over a local power grid.

BACKGROUND

One of the main goals of the future energy grids is high penetration of Renewable Energy Sources (RES). However, because of their uncontrollable nature, RES integration often causes grid stability problems. Furthermore, from economic and efficiency points of view, local load balancing and consumption within the same microgrid are the most desirable choices for residential renewable energy systems. Hence, achieving sustainable communities that can be decoupled from the main grid is one of the final aims of decentralized energy grids powered by Distributed Energy Resources (DER).

With high penetration of RES, the issues related to discrepancy in demand and generation can become much more severe than what can be managed through reasonably sized electricity storage. For instance, in Germany there are already grid segments in which, during peak sunshine hours, the electricity flows at a high rate to higher voltage levels since the local demand is much lower. Such a significant difference in demand and supply could not be completely mitigated through electricity storage that can be normally found in the residential sector.

On the other hand, many households feature a different type of energy storage that can be used to improve the balancing performance. Namely, many households have thermal storage used for heating and domestic hot water. Furthermore, electric boilers and heat pumps are also available in many households, providing a coupling point between two energy carriers: electricity and heat. Similarly to heat demand, the electricity to thermal coupling points can represent cooling units. Hence, in the following text all references to heating can be equally applied to the cooling.

BRIEF SUMMARY OF THE INVENTION

In an embodiment, the present invention provides a system and method that achieve electricity and heat load balancing within a community of energy nodes. The system includes a central control device to solve an optimization problem over a planning horizon and to run an allocation algorithm. Local agent devices communicate with the central control device. Each local agent device receives input variables or parameters from a respective energy node. Each energy node includes electricity generation equipment, electrical heat-generating equipment, and power transmission equipment. The energy nodes have electricity storage equipment and thermal storage equipment. The local agent devices operate the electrical heat-generating equipment based on an allocation instruction received from the central control device. The central control device receives status information from the local agent devices and uses the status information in the allocation algorithm to determine an amount of energy to be converted from electricity to heat by the electrical heat-generating equipment of the energy nodes, so as to provide the allocation instruction to the energy nodes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The following summarizes the assumptions according to an embodiment of the present invention, generalizing the concepts of household with the term energy node. The community represents all nodes ($node_i$) participating in an electric system 100, as illustrated in FIG. 1.

Figure 1:
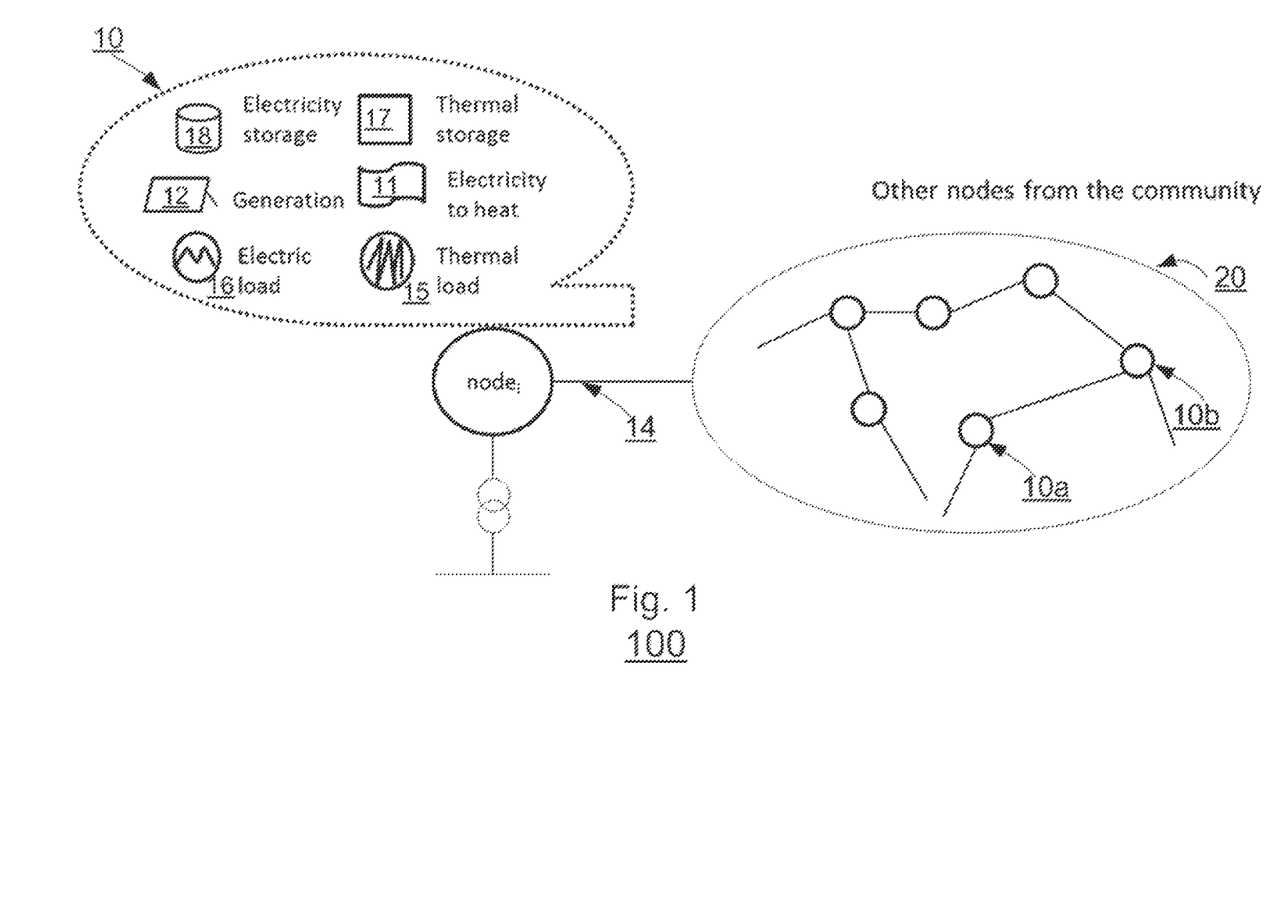
FIG. 1 schematically illustrates a nodal structure of a household and other nodes of a community according to an embodiment of the invention.

Referring to FIG. 1, the structure of the energy node 10 includes power generation equipment 12 (for example, photovoltaic (PV) panels or wind turbines), electricity storage 18 (for example, batteries or capacitors), and power transmission equipment 14 (for example, cables and electrical connectors) from the power generation equipment 12 for use in handling its own power load 16 and for transfer to the other nodes 10a, 10b in the community 20 or to an energy producer or distributor. The energy node 10 further includes electrical heat-generating equipment 11 (herein meaning any equipment that converts electricity to heat, for example, electric heating generators, electric boilers, and heat pumps), heat storage equipment 17 (for example, hot water tank or thermal sink), and thermal load 15 (for the local node's own heat consumption). The energy nodes 10 are connected to each other in the community 20 through a distribution electricity grid.

According to embodiments of the invention:

A node has its local uncontrollable energy generation, electric load, thermal load, electricity storage, thermal storage, and an electric appliance that converts electricity into heat (not all nodes have to include both types of storage, in the case that a node does not have electric or thermal storage its energy capacity can be considered to be zero in managing energy distribution and sharing).

Nodes are connected to the same distribution grid into which they can feed-in electricity or consume from it.

Electricity can be bought from an electric utility at dynamically changing prices, and optionally sold to it.

According to embodiments of the invention, a system and method simultaneously manage both types of storage. The control is performed centrally for all nodes 10, considering current and future parameters of the entire community such as renewable energy generation, electricity and heat demand, state-of-charge of storage (SOC), etc.

Figure 2:
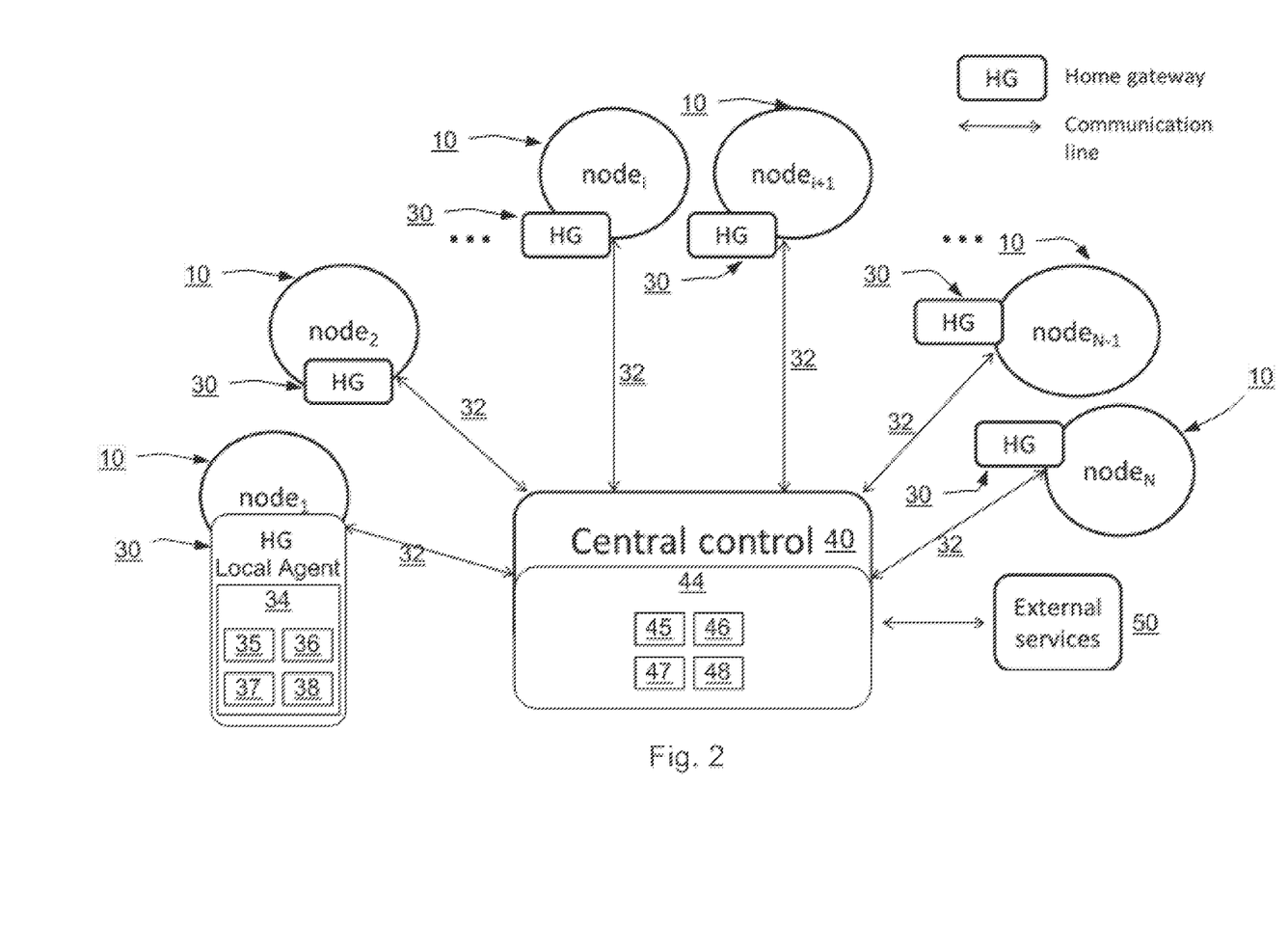
FIG. 2 schematically illustrates a system layout according to an embodiment of the invention.

System Design:

Referring to FIG. 2, a system according to an embodiment of the present invention includes the central control device 40 processing information received by the local agent devices 30 (or home gateways) of the energy nodes 10, via communications 32 through communication lines, in accordance with an allocation algorithm 42 running on the central control device 40. The central control device 40 can include, for example, a server device 44, or computational processing device with a computational processor 45 and memory devices 46, a communication-receiving unit 47 and a communication-transmitting unit 48. The local agent devices 30 can also include, for example, a server device 34, or computational processing device with a computational processor 35 and memory devices 36, a communication-receiving unit 37 and a communication-transmitting unit 38 and can be configured to receive, store and process energy generation and usage data over time from the energy nodes 10. The local agent devices 30 act autonomously on behalf of their respective energy nodes 10.

The central control device 40 is aware of the electric energy flows between the energy node community 20 and the higher level electricity grid. This information can be available through direct measurements, or received from the DSO. The central control device 40 can receive other information, such as weather forecasts, from external services 50 through a telecommunication network.

Communication Between Central Control and Energy Nodes:

Optimization of the energy distribution in the energy nodes 10 can be done repeatedly and continuously. Before each optimization process, the nodes 10 send communications 32 to the central control device 40. For example, the nodes 10 transmit their current SOC of both types of storage (electrical and thermal storages). The central control device 40 can store and keep track of expected SOC of all nodes 10. This approach can avoid inaccuracies of prediction due to losses of data. Additionally, if there is a failure of a particularly node, it can be immediately discovered, for example, for storage failures and connectivity issues of any server device 32 of a local agent device 30 in any node 10.

In an extended communication, the nodes 10 can provide their hint or a prediction on their electricity and heat demand in proximate future. For instance, if the tenants know that they will be away for a longer period of time, this information can be sent to help the central control device 40 to increase the accuracy of its load prediction. Also, the local agent devices 30 can send the household's current electricity and heat consumption, which can be used to improve the charging/discharging request distribution to the nodes 10 done by the central control device 40.

Once the optimization problem is solved and the desired amount of energy to be charged/discharged is determined, the central control device 40 sends charging/discharging requests/instructions to the participating nodes 10. The nodes 10 follow the instructions received from the central control device 40 to perform the charging/discharging to distribute or allocate the energy as appropriate.

Figure 3:
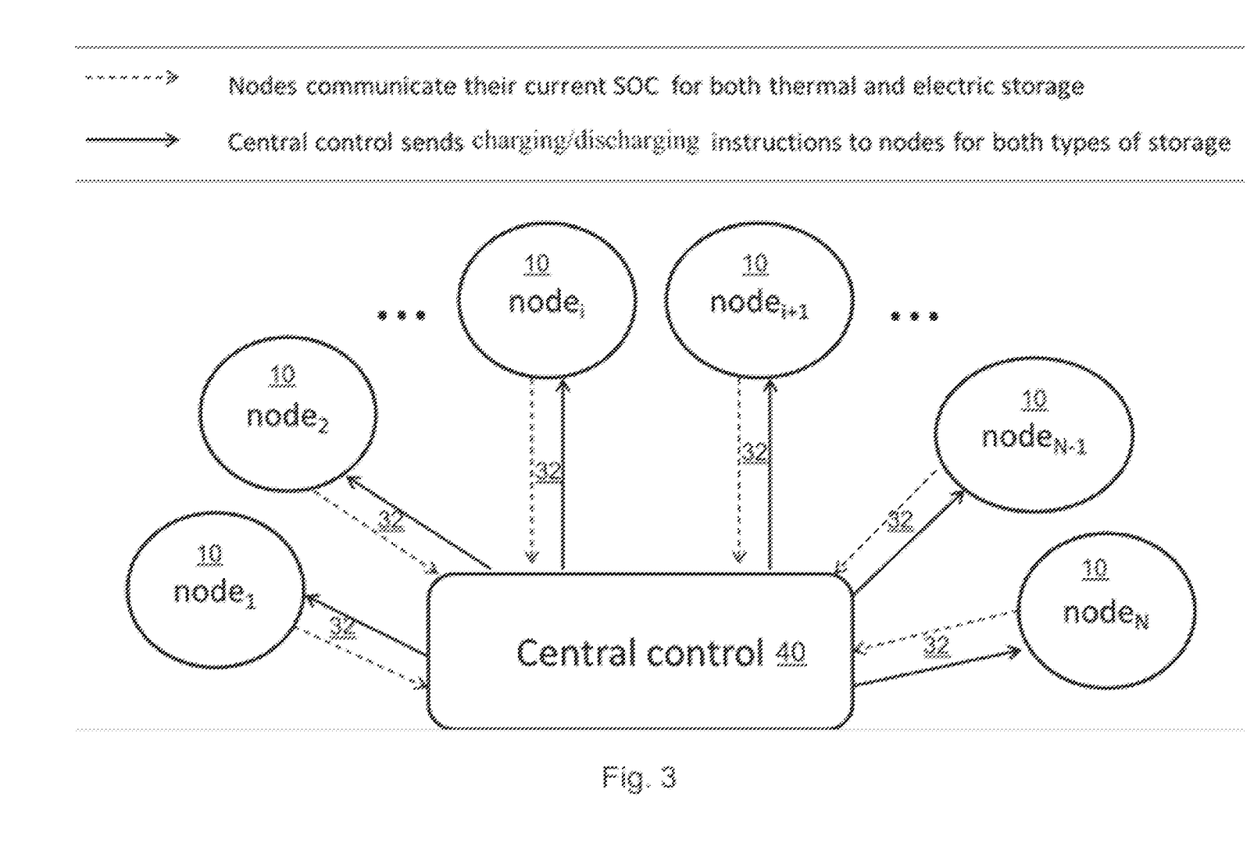
FIG. 3 schematically illustrates a communication platform for communicating within a system according to an embodiment of the invention.

FIG. 3 schematically illustrates a communication platform for communicating within a system according to an embodiment of the invention.

Energy Node:

Once an energy node $n_i$ receives the instructions from the central control device 40, it determines how the heating device that converts electricity to heat should be operated. This comes from the equation of heat balance for the node $n_i$:

$$\eta_i P_{HEATi}^{t} + P_{TSi}^{out,t} - P_{TSi}^{in,t} - L_{Hi}^{t} = 0 \quad \text{(equation 1)}$$

The meaning of variables and parameters used in this document is given in Table 1 below.

TABLE 1

Control variables and parameters:

| Subsystem | Label | Meaning | Type |
|---|---|---|---|
| Electricity Load | $L_{Ei}^{t}$ | Electricity demand of node i at time t | Parameter |
| Heat Demand | $L_{Hi}^{t}$ | Heat demand of node i at time t | Parameter |
| Community Grid | $P_{COMMUNITY}^{t}$ | Electrical power that node i exchanges with the grid at time t | Auxiliary variable |
| Coupling Point | $P_{HEATi}^{t}$ | Electrical power converted into heat in node i at time t | Auxiliary variable |
| | $\eta_i$ | Power to heat conversion efficiency of node i | Parameter |
| SP Solar Panel | $P_{SPi}^{out,t}$ | Power output of the solar panels of node i at time t | Parameter |
| ESS Energy Storage Systems | $P_{ESSi}^{in,t}$ | Charging power of electricity storage in node i at time t | Control variable |
| | $P_{ESSi}^{out,t}$ | Discharging power of electricity storage in node i at time t | Control variable |
| | MaxESSRate$_i$ | Maximal (dis)charge rate of electricity storage in node i | Parameter |

TABLE 1-continued

Control variables and parameters:

| Subsystem | Label | Meaning | Type |
|---|---|---|---|
| TS Thermal Storage | $P_{TSi}^{in,t}$ | Output power from the thermal storage in node i at time t | Control variable |
| | $P_{TSi}^{out,t}$ | Input power to the thermal storage in node i at time t | Control variable |
| Time interval | d | Time duration of an interval of planning horizon | Parameter |
| Higher Level Grid | $P_{GRID}^{out,t}$ | Electrical power that the community draws from the higher level grid at time t | Control variable |
| | $P_{GRID}^{in,t}$ | Electrical power that the community feeds in the higher level grid at time t | Control variable |
| | $Price_E^{out,t}$ | Price at which the community can buy electric energy from the utility at time t | Parameter |
| | $Price_E^{in,t}$ | Price at which the community can sell electric energy at time t | Parameter |
| Electricity Demand | $L_E^t$ | Electricity demand of the entire community at time t (excluding electricity needed for heating) | Parameter |
| Heat Demand | $L_H^t$ | Heat demand of the entire community at time t | Parameter |
| Generation | $G^t$ | Renewable energy generation of the entire community at time t | Parameter |
| Aggregated Electricity Storage | $P_{ESS}^{out,t}$ | The total power that the community should discharge from electric storages at time t | Control variable |
| | $P_{ESS}^{in,t}$ | The total power that the community should charge into electric storages at time t | Control variable |
| | MaxESSRate | The sum of maximal (dis)charging rates of electric storages across the community | Parameter |
| | ESSCapacity | The sum of energy capacities of electric storages across the community | Parameter |
| | $\omega_{ESS}^{out}$ | Average discharging efficiency of electric storages in the community | Parameter |
| | $\omega_{ESS}^{in}$ | Average charging efficiency of electric storages in the community | Parameter |
| Aggregated Thermal Storage | $P_{TS}^{out,t}$ | The total power that the community should discharge from thermal storages at time t | Control variable |
| | $P_{TS}^{in,t}$ | The total power that the community should charge into thermal storages at time t | Control variable |
| | MaxTSRate | The sum of maximal (dis)charging rates of thermal storages across the community | Parameter |
| | TSCapacity | The sum of energy capacities of thermal storages across the community | Parameter |
| | $\omega_{TS}^{out}$ | Average discharging efficiency of thermal storages in the community | Parameter |
| | $\omega_{TS}^{in}$ | Average charging efficiency of thermal storages in the community | Parameter |
| | LossTS | Average loss of stored thermal energy over an interval of time | Parameter |
| Coupling points | $P_{HEAT}^t$ | The total amount of electrical power that the community should convert into heat at time t | Auxiliary variable |
| | $\eta_{AVG}$ | Average efficiency of conversion of electricity into heat | Parameter |
| | InstalledHeatingCapacity | The total heating capacity of the community given as input power | Parameter |

Since the node knows its current heat demand, and the access to the thermal storage has been fixed by the central control device 40, the amount of electric power to run the heating device can be computed from equation 1. Then the electricity exchange of the node with the rest of the community is determined by the electricity balance equation:

$$P_{SPi}^{out,t} + P_{ESSi}^{out,t} - P_{ESSi}^{in,t} - L_{Ei}^{t} - P_{HEATi}^{t} = P_{COMMUNITYi}^{t} \quad \text{(equation 2)}$$

Note that the very node does not have to compute the value of power exchange with the community, that's the amount the node will automatically consume from the grid to top up its needs, or the amount that is a surplus and that will be feed-in.

Central Control:

The central control device 40 performs two important tasks besides the auxiliary steps and energy accounting. It first solves an optimization problem over a planning horizon in order to determine how much energy should be charged/discharged over the entire community. Afterwards, the second important task allocates the desired amounts of thermal and electricity storage charging/discharging to the nodes 10.

Figure 4:
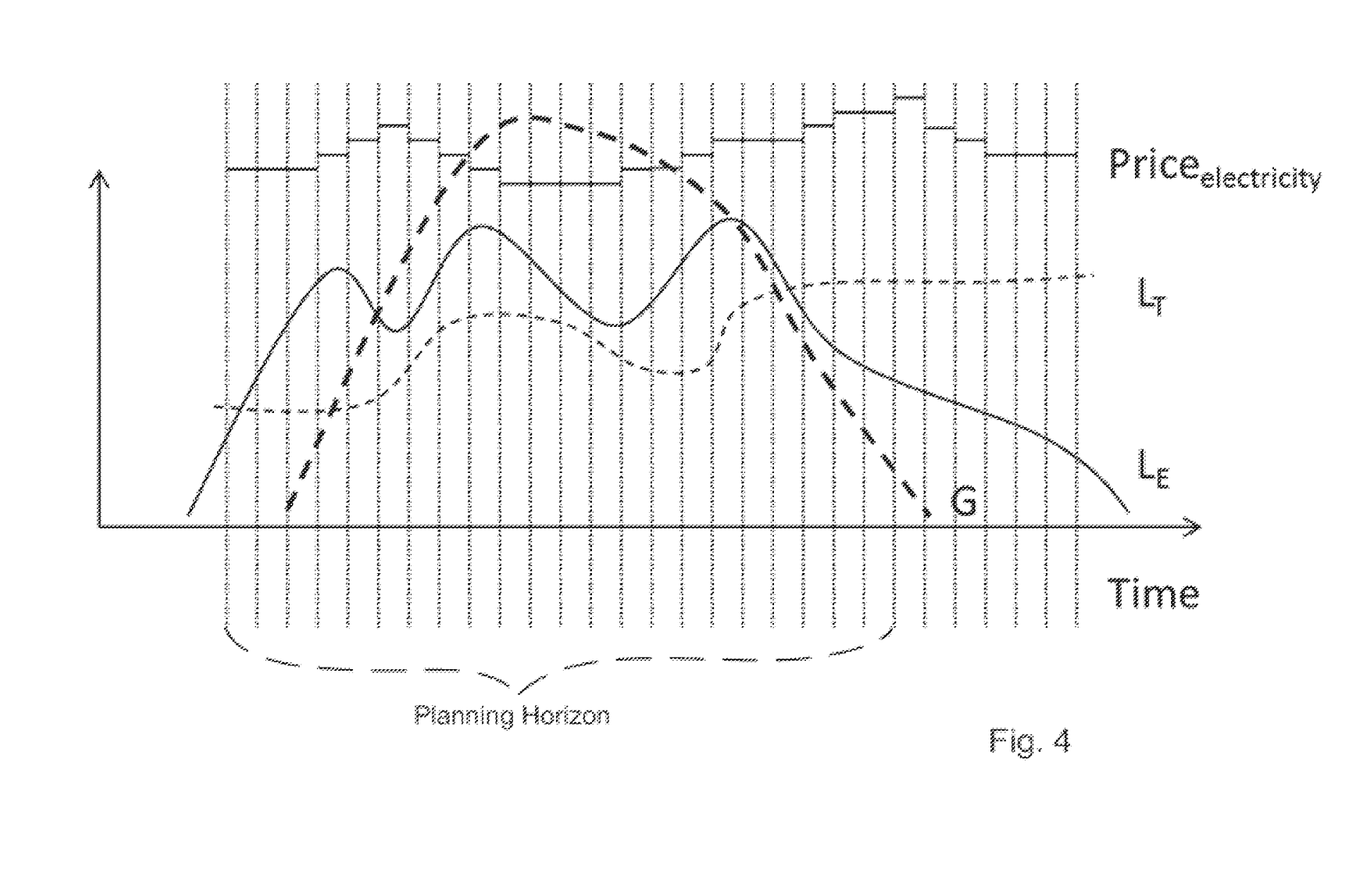
FIG. 4 graphically illustrates an optimization over a planning horizon according to an embodiment of the invention.

FIG. 4 graphically illustrates an optimization over a planning horizon according to an embodiment of the invention.

The optimization problem is solved for the entire community, considering all nodes 10 as a single entity. The central control device 40 predicts the aggregated renewable energy generation over the planning horizon, as well as the aggregated electricity and heat demands for the same period (as shown in FIG. 4). Also, the central control device 40 obtains or predicts future electricity prices depending on the contracted pricing scheme. These inputs are used together with the aggregated storage constraints, in order to determine the (sub)optimal usage of the energy storage available in the community. The objective function is defined based on the selected goal. Some embodiments of the objective function can be the following:

min $\Sigma_t P_{GRID}^{out,t} * d$ if the goal is to minimize the total amount of energy bought from the grid (this means that the consumption of locally generated energy is maximized);

min $\Sigma_t P_{GRID}^{out,t} * d * Price_E^{out,t}$ if the goal is to minimize the total costs paid by the community to the electricity supplier; or max $\Sigma_t P_{GRID}^{in,t} * d * Price_E^{in,t} - P_{GRID}^{out,t} * d * Price,_E^{out,t}$ if it is also possible to sell electricity to the grid.

The constraints of the optimization problem reflect the nature of the system. Similarly to the node level, the electricity and heat balances need to be satisfied at the level of the entire community. Hence, the following two constraints describe these balances:

electricity balance
for all t: $P_{GRID}^{out,t} + G^t + P_{ESS}^{out,t} - L_E^t - P_{HEAT}^t - P_{ESS}^{in,t} - P_{GRID}^{in,t} = 0$ heat balance
for all t: $P_{TS}^{out,t} + \eta_{AVG} P_{HEAT}^t - L_H^t - P_{TS}^{in,t} = 0$.

The exchange with the grid (utility) is always positive, but represented by two variables (to/from the grid):
for all t: $0 \leq P_{GRID}^{in,t}, P_{GRID}^{out,t}$ The amount of power used for heating cannot be higher than the total installed capacity:
for all t: $0 \leq P_{HEAT}^t \leq$ InstalledHeatingCapacity.

Also, there are technical constraints of the energy storages:
for all t: $0 \leq P_{TS}^{in,t}, P_{TS}^{out,t} \leq$ MaxTSRate
for all t: $0 \leq P_{ESS}^{in,t}, P_{ESS}^{out,t} \leq$ MaxESSRate
for all t: $0 \leq ESS^t \leq$ ESSCapacity
for all t: $0 \leq E_{TS}^t \leq$ TSCapacity.

The following constraints reflect the storage charging and discharging (aggregated values):
for all t: $E_{ESS}^{t+1} = ESS^t - \omega_{ESS}^{out} P_{ESS}^{out,t} * d + \omega_{ESS}^{in} P_{ESS}^{in,t} * d$
for all t: $E_{TS}^{t+1} = (1 - LossTS) * E_{TS}^t - \omega_{TS}^{out} P_{TS}^{out,t} * d + \omega_{TS}^{in} P_{TS}^{in,t} * d$.

The control variables are $P_{TS}^{in,t}$, $P_{TS}^{out,t}$, $P_{ESS}^{in,t}$, $P_{ESS}^{out,t}$, $P_{GRID}^{in,t}$ and $P_{GRID}^{out,t}$ (all positive). Because of the problem formulation, only one of $P_{TS}^{in,t}$ and $P_{TS}^{out,t}$, one of $P_{ESS}^{in,t}$ and $P_{ESS}^{out,t}$ and one of $P_{GRID}^{in,t}$ and $P_{GRID}^{out,t}$ can be higher than zero which basically means that the energy will be charged or discharged from the storages across the community during one time interval but never simultaneously charged and discharged. Similarly, the community will buy electricity from the utility or sell it but never buy and sell at the same time. Hence, the central control device 40 needs to allocate a certain amount of electric energy to be charged or discharged to the nodes 10, and similarly with the thermal energy. The central control device 40 requests the nodes 10 to follow the storage usage instructions.

Different approaches can be used to allocate a given amount of energy to be charged/discharged over the next time interval to a group of nodes 10. For an example of such a possible allocation, let S denote the total power (charging or discharging) that needs to be requested from all nodes 10. Then for each node, the maximal power rate $M_i$ that can be allocated to the node is computed as a minimum of the theoretical maximum (MaxESSRate$_i$—a value stored in the server for each node) and a real maximum that depends on the current SOC and the storage energy capacity (the energy capacity is also stored in the server for each node). Then the nodes 10 are ordered decreasingly by their maximal power rate $M_i$ and they are taken until the sum of the maximal power rates does not become higher than S. These nodes 10 will be allocated to charge/discharge their maximal power rates, expect for the last one that can be allocated only the difference to S.

Figure 5:
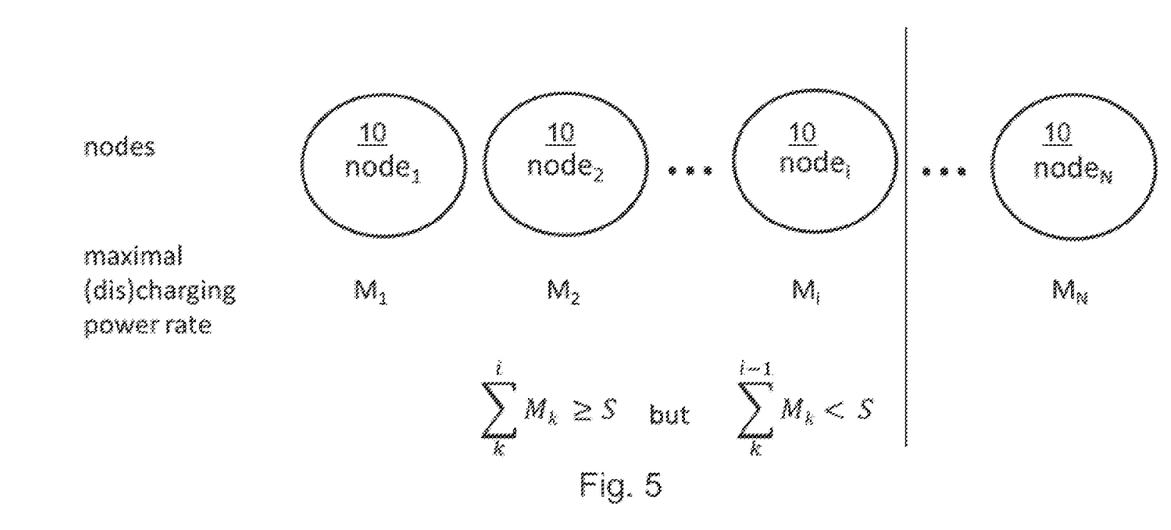
FIG. 5 schematically illustrates a charging request allocation to the nodes according to an embodiment of the invention.

FIG. 5 schematically illustrates a charging request allocation to the nodes according to an embodiment of the invention.

Through this optimization approach, the community optimizes the set goal over the planning horizon. Certain nodes 10 will receive instructions that, from their isolated point of view, may not make sense, but they lead to an improvement in the community. For instance, a node can be requested to discharge its electricity storage even when its current generation covers its energy needs. This can happen when electricity is expensive and there is another node that needs addition energy besides its own generation.

Figure 6:
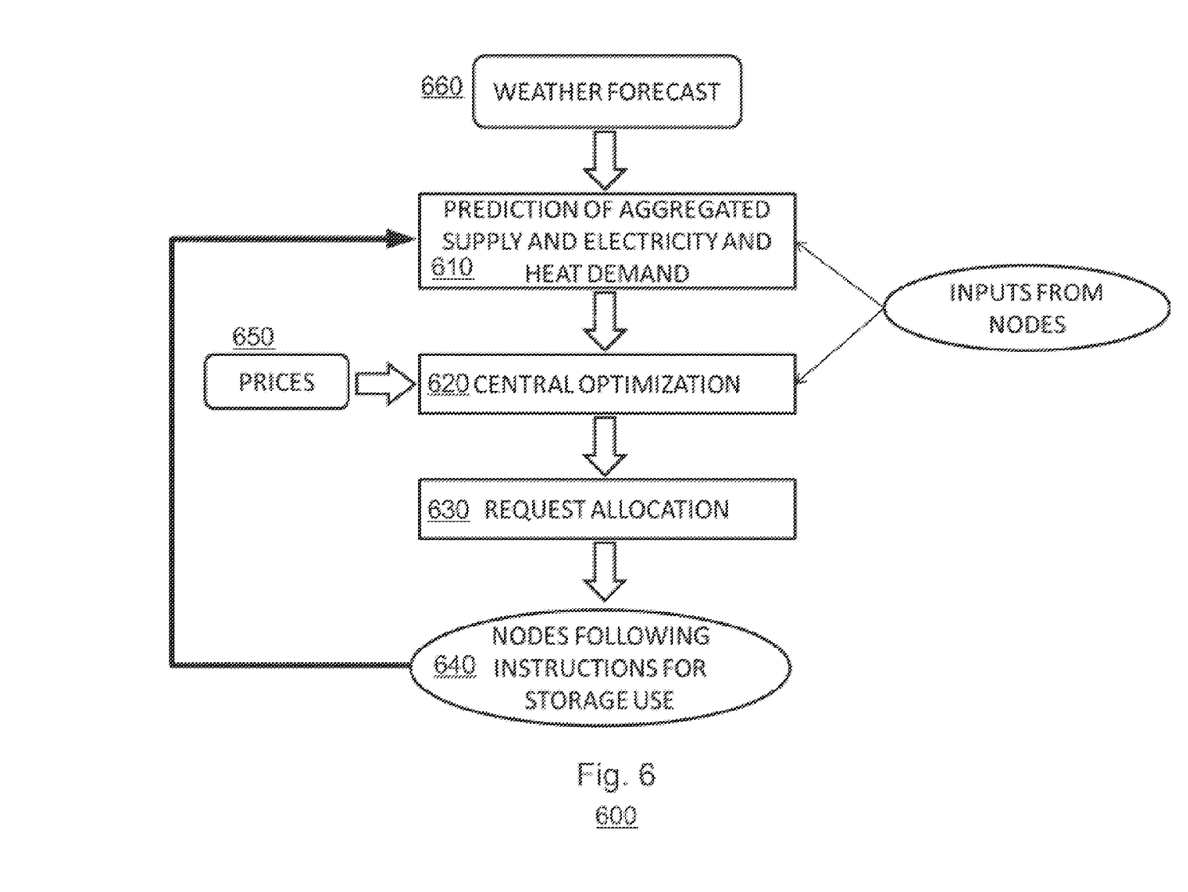
FIG. 6 schematically shows one optimization cycle according to an embodiment of the invention.

A summary of the all steps involved in one optimization cycle is given in FIG. 6.

The central control device 40 also performs certain auxiliary steps necessary for the optimization process. For example, the server 44 of the central control device 40 can obtain a weather forecast from external services 50. Based on this forecast, the central control device 40 predicts the aggregated renewable energy generation and electricity and heat demand. Also, in the case of dynamic electricity pricing, the server 44 can obtain or predict the prices for the planning horizon.

The server 44 is also in charge of accounting of energy consumption and provision for all participating nodes 10. Since some nodes 10 can consume more energy than they provide, and the other way around, a business model can be provided and used in order to motivate participation of all nodes 10. This business model can provide a means of fairness as discussed below.

Fairness:

In an embodiment, the method of the invention optimizes a certain goal, such as local consumption of renewable energy or cost reduction for the entire community. This is a purely technical goal and how these benefits are distributed to the participating nodes 10 is not considered here. Fairness within the community can be defined through a business model that takes into account resources provided by each node, as well as their consumption. This business model, for example, can define how the electricity costs are distributed among the participants.

Exemplary Application

In an embodiment, the invention comprises a community of prosumers, such as a residential neighborhood with households equipped with solar panels, heat pumps or electric boilers and electricity and thermal storage. Through a synchronized and holistic approach considering coupling of two different energy carriers, the community can increase the percentage of locally consumed solar energy and/or decrease the total costs paid to the electric utility. This is achieved through a simultaneous control of the both types of storage across the entire community. For instance, an excess in currently generated solar energy can be stored as thermal energy, if it is known that the household will soon need heat. Furthermore, in the case of solar energy shortage within a household due to high power consumption, another household can discharge its electricity storage and avoid buying electricity from the utility.

Depending on the specified goal (increase of local consumption of renewable energy or pure economic interests based on costs/profit), one improvement of an embodiment of the invention compared to known methods and systems comes through coordinated resource management of multiple energy carriers across an entire community of energy prosumers. Advantages provided according to embodiments of the invention also include:

1) Combined control system for compensating electricity overproduction using electricity-thermal coupling and respective thermal and electricity storage
2) Optimization over the entire community of local consumption of RES through collaboration of all community nodes 10
3) Near real-time actuation and control of the nodes 10's operation including demand, generation and pricing prediction, adaptable to different optimization goals A system and method to increase the local consumption of local RES production is provided, in embodiments of the invention, by balancing simultaneously electricity and heat loads across a network of prosumers. In an embodiment, physical requirements for the system include at least:

A community of prosumers with high RES penetration connected through local agent devices 30 to the central server 44; and
Diversity of electricity and thermal storage units and electricity-heat coupling points.

FIG. 6 schematically shows an optimization method 600 according to an embodiment of the invention.

In an embodiment of the method 600, at block 610 the central control device 40 makes prediction of aggregate energy production and electricity and heat demand of all participating nodes 10, based on status information from the local agent devices 30.

At block 620, the central control device 40 performs central optimization using the allocation algorithm to generate allocation requests/instructions.

At block 630, the central control device 40 sends the allocation requests/instructions to the local agent devices 30.

At block 640, the local agent devices 30 operate the respective energy nodes 10's electricity and/or thermal storage to charge/discharge according to the allocation instructions. The method 600 may loop back to block 610 to continuously make further predictions and further optimizations based upon new information.

At block 650, the central control device 40 may consider energy prices in the optimization using the allocation algorithm.

At block 660, the central control device 40 may consider weather forecast information in making prediction of aggregate energy production and electricity and heat demand of all participating nodes 10.

The method 600 achieves the following:
Supply and demand prediction for the entire community;
Optimization of aggregated community behavior over a planning horizon; and
Allocation of storage operation requests to the individual nodes Thus, in an embodiment, the invention couples electricity and heat demand in order to improve load balancing performance of a community of prosumers. The entire thermal and electric storage and demand are integrated holistically using the aggregated knowledge about the future supply, demand and pricing to optimize the specified goal of the community. The gained balancing performance in particular means:

Reduction of grid costs (delay of substation upgrades, delay of grid level ESS)
Reduction of ESS costs for prosumers (through virtual storage in other community nodes)
Increase of grid stability
Reduction of energy losses due to conversion to higher voltage and transmission
Possible reduction of secondary heat source costs such as gas costs The energy nodes 10 provide sufficient flexibility to the central control device 40 in order to achieve improvements. This means that a certain amount of storage capacity is provided to perform this type of energy management. Also, the electricity-heat coupling points are provided and made available in the system. Further provided is a smart grid with respective support for intelligent machine control for load and storage units.

The present invention can be used, for example, for energy management by micro grid operators, and/or community grid mediators.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed with the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF ACRONYMS

RES—Renewable Energy Sources
PV—Photovoltaic
DER—Distributed Energy Resources
SOC—State Of Charge
TS—Thermal Storage
ESS—Energy Storage System (Electricity)
DSO—Distribution System Operator

What is claimed is:

1. A system for electricity and heat load balancing within a community of energy nodes, the system comprising:
   a central controller configured to solve an optimization problem over a planning horizon and to run an allocation algorithm; and
   a plurality of local agents configured to communicate with the central controller, each of the local agents being associated with and configured to receive input variables or parameters from a respective one of the energy nodes, each of the energy nodes having electricity generation equipment, electrical heat-generating equipment, power transmission equipment, electricity storage equipment and thermal storage equipment, at least one of the local agents being configured to operate the respective electrical heat-generating equipment based on an allocation instruction received from the central controller,
   wherein the central controller is configured to receive status information from each of the local agents and to use the status information, including state of charge information for each of the electrical and thermal storage equipment of the energy nodes, in the allocation algorithm to determine an amount of energy to be converted from electricity to heat by the respective electrical heat-generating equipment of at least one of the energy nodes, so as to provide the allocation instruction to the at least one of the energy nodes and cause the at least one of the energy nodes to convert the amount of energy from electricity to heat and store the heat in the thermal storage equipment of the at least one of the energy nodes.

2. The system according to claim 1, wherein, for each of the energy nodes, the electrical heat-generating equipment is coupled to the thermal storage equipment, the electrical heat-generating equipment including at least one of an electric heat generator, an electric boiler and a heat pump, and the thermal storage equipment including at least one of a hot water tank or a thermal sink.

3. The system according to claim 1, wherein the central controller is configured to receive weather forecast information and use the weather forecast information in the allocation algorithm.

4. The system according to claim 3, wherein the central controller is configured to estimate aggregated renewable energy generation and electricity and heat demand of the community.

5. The system according to claim 1, wherein the central controller is configured to determine the amount of energy to be received from or supplied to individual ones of the energy nodes based on electric consumption and heat consumption predicted by the local agents using past usage data stored in the local agents.

6. A central controller comprising:
   a server device associated with a community of energy nodes which each include electricity generation equipment, electrical heat-generating equipment, power transmission equipment, electricity storage equipment and thermal storage equipment, each of the energy nodes being associated with a local agent;
   a communication receiver configured to receive, from the local agents, status information from each of the local agents;
   a computational processor running an allocation algorithm configured to determine an amount of energy to be converted from electricity to heat by the respective electrical heat-generating equipment of at least one of the energy nodes using the status information including state of charge information for each of the electrical and thermal storage equipment of the energy nodes, so as to provide the allocation instruction to the at least one of the energy nodes; and
   a communication transmitter configured to communicate to at least the local agent associated with the at least one of the energy nodes the allocation instruction to operate the respective electrical heat-generating equipment based on the allocation instruction so as to cause the at least one of the energy nodes to convert the amount of energy from electricity to heat and store the heat in the thermal storage equipment of the at least one of the energy nodes.

7. The central controller according to claim 6, wherein, for each of the energy nodes, the electrical heat-generating equipment is coupled to the thermal storage equipment, the electrical heat-generating equipment including at least one of an electric heat generator, an electric boiler and a heat pump, and the thermal storage equipment including at least one of a hot water tank or a thermal sink.

8. The central controller according to claim 6, wherein the central controller is configured to receive weather forecast information and use the weather forecast information in the allocation algorithm.

9. The central controller according to claim 8, wherein the central controller is configured to estimate aggregated renewable energy generation and electricity and heat demand of the community.

10. The central controller according to claim 6, wherein the central controller is configured to determine the amount of energy to be received from or supplied to individual ones of the energy nodes based on electric consumption and heat consumption predicted by the local agents using past usage data stored in the local agents.

11. A method of providing electricity and heat balancing in a community of energy nodes, the method comprising:

receiving, from local agents each of which is connected to a respective one of the energy nodes, requests to supply energy to the community or to receive energy from the community;

determining, by a central controller having a computational processor running an allocation algorithm, an amount of energy to be converted from electricity to heat by respective electrical heat-generating equipment of at least one of the energy nodes using status information from the local agents including state of charge information for electrical and thermal storage equipment of the respective energy nodes; and providing, by the central device, an allocation instruction including the amount of energy, to the local agent associated with the at least one of the energy nodes so as to cause the at least one of the energy nodes to convert the amount of energy from electricity to heat and store the heat in the thermal storage equipment of the at least one of the energy nodes.

12. The method according to claim 11, wherein, for each of the energy nodes, the electrical heat-generating equipment is coupled to the thermal storage equipment, the electrical heat-generating equipment including at least one of an electric heat generator, an electric boiler and a heat pump, and the thermal storage equipment including at least one of a hot water tank or a thermal sink.

13. The method according to claim 11, wherein the central controller receives weather forecast information and uses the weather forecast information in the allocation algorithm.

14. The method according to claim 13, wherein the central controller estimates aggregated renewable energy generation and electricity and heat demand of the community.

15. The method according to claim 11, wherein the central controller determines the amount of energy to be received from or supplied to individual ones of the energy nodes based on electric consumption and heat consumption predicted by the local agents using past usage data stored in the local agents.

* * * * *